UNITED STATES PATENT OFFICE.

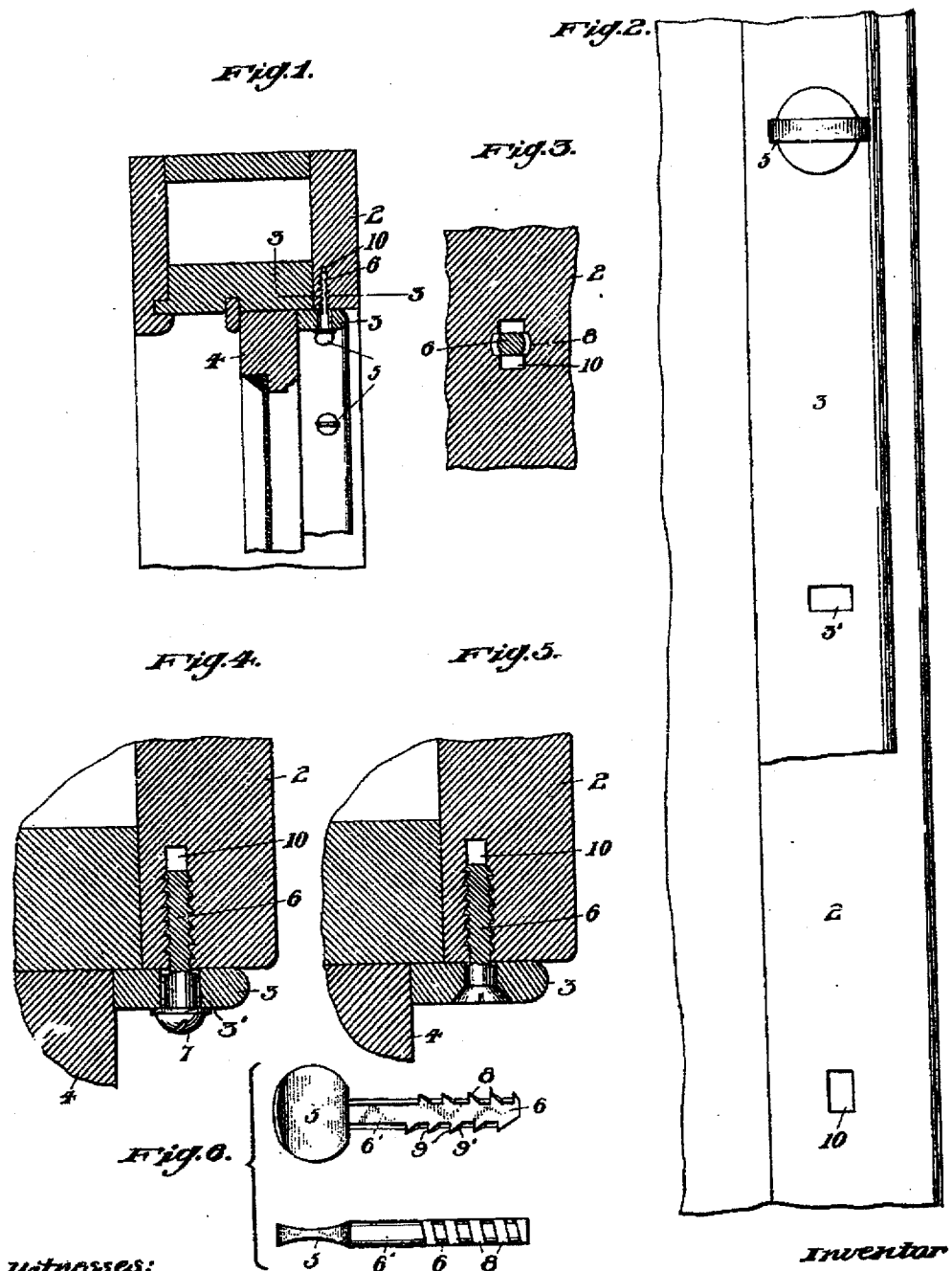

ROBERT McMILLEN, OF PITTSBURG, PENNSYLVANIA.

WINDOW-BEAD FASTENER.

No. 858,897.  Specification of Letters Patent.  Patented July 2, 1907.

Application filed May 9, 1906. Serial No. 315,895.

*To all whom it may concern:*

Be it known that I, ROBERT McMILLEN, a citizen of the United States, residing at Pittsburg, in the county of Allegheny and State of Pennsylvania, have invented certain new and useful Improvements in Fastening Window-Beads, &c., of which the following is a specification, reference being had therein to the accompanying drawings.

The object of this invention is to provide improved fastening means for window-beads and other removable devices, which may be quickly applied and as readily removed, and which when in place securely holds the bead or other object.

While the invention is designed primarily for securing window-beads, and is so illustrated, it is adapted for other uses.

In the accompanying drawing, Figure 1 is a sectional plan view of one side of a window-casing, showing my improvement applied thereto. Fig. 2 is an elevation of portions of the bead and casing. Fig. 3 is a sectional view, enlarged, taken on line 3—3 of Fig. 1. Figs. 4 and 5 are sectional views, showing fasteners of modified form. Fig. 6 is a detail view of the fastening device.

Referring to the drawing, 2 designates the portion of the window-frame to which bead 3 is secured, and 4 is the sash.

5 is the thumb-screw head of the fastener and 6 the shank thereof, the latter having smooth neck portion 6′ which passes through the bead. In Fig. 3 a slotted machine-screw head 7 is shown, while in Fig. 4 a beveled wood-screw head 7′ is illustrated, the latter being countersunk in the bead. Shank 6 has greater width than thickness and is formed with two flat sides or faces 6′. Projecting from the narrower edges thereof are the diagonal thread-like teeth 8, the rear edge 9 of each tooth or thread being disposed at approximately a right angle to the face of the shank from which it projects, and the front edge 9′ thereof sloping forwardly, as shown, the formation somewhat resembling a screw. It will be observed however that the device is not tapered like the ordinary wood-screw, the toothed or threaded portion thereof being the same width from end to end so that all of the teeth cut into the sides of the socket when the fastener is turned, as will presently appear.

Frame 2 is formed with the elongated or slot-like sockets 10, of sufficient width, length and depth to admit the fastener, bead 3 being of course provided with an opening 3′ registering therewith. With the bead in place, the fastener is inserted and while being pressed inward is given a quarter turn, thus turning shank 6 cross-wise in socket 10, this movement causing teeth or threads 8 to cut or bite into the sides of the socket, as clearly shown in Fig. 3, the pitch of the threads or teeth operating to draw the device inward. The bead is thus securely held, and to remove it it is only necessary to give the fastener a quarter turn backward, such movement disengaging the teeth or threads, whereupon the device may be readily withdrawn. Bead-opening 3′ is preferably of slot-form so that it may be adjusted to the sash as required.

It will be understood that sockets 10 may be formed in any device of wood or equivalent material to which another object is to be removably secured, and that such other object may be provided with the necessary opening for passing the securing-device.

I claim:—

1. The combination of a wood object having a socket of greater length than width, a member to be secured thereto having a passage registering with the socket, a headed fastening device having its shank portion adapted to pass through the member to be secured and into the socket, the shank being of greater length than thickness and formed with teeth, the shank being adapted in one position to freely enter the socket and when turned adapted to force the teeth thereof into the socket walls.

2. The combination of a wood object having an oblong socket, a member to be secured thereto having an opening registering with the socket, and a headed fastening device having a shank portion adapted to pass through the member to be secured and into the socket, teeth projecting from the shank and disposed at an angle to the axis of the shank, the shank being of greater width than thickness and adapted in one position to freely enter the socket and when turned adapted to force the teeth into the socket walls and draw inwardly upon the secured member.

3. The combination of a wood object having an oblong socket, a member to be secured thereto having an opening registering with the socket, a headed fastening device which extends through the member to be secured and into the socket, teeth projecting from two opposite sides of the shank with the remaining two opposite sides of the latter plain, the teeth being disposed at an angle to the axis of the shank, whereby when the device is turned the teeth bite into the opposite walls of the socket and operate to draw the device there into and tighten the member to be secured against the socket-formed object.

In testimony whereof I affix my signature in presence of two witnesses.

ROBERT McMILLEN.

Witnesses:
J. M. NESBIT,
VINNIE M. MYERS.